United States Patent [19]

Volino

[11] Patent Number: 4,661,715

[45] Date of Patent: Apr. 28, 1987

[54] ELECTRIC ROLLER CLUTCH STARTER DRIVE

[75] Inventor: Nicholas A. Volino, Elmira, N.Y.

[73] Assignee: Facet Enterprises, Inc., Tulsa, Okla.

[21] Appl. No.: 711,633

[22] Filed: Mar. 14, 1985

[51] Int. Cl.[4] .......................... F02N 11/08; H02P 9/04

[52] U.S. Cl. .......................................................... 290/48

[58] Field of Search ............................... 290/48, 38 R; 123/179 R, 179 K, 179 M

[56] References Cited

U.S. PATENT DOCUMENTS

| | | | |
|---|---|---|---|
| 1,939,405 | 12/1933 | Nardone | 290/38 C |
| 2,727,158 | 12/1955 | Seilly | 290/38 R |
| 3,084,561 | 4/1963 | Mattson | 290/38 R |
| 3,124,694 | 3/1964 | Seilly | 290/38 R |
| 3,572,133 | 3/1971 | Giometti | 290/38 R |
| 3,922,558 | 11/1975 | Hollyoak | 290/38 A |
| 4,366,385 | 12/1982 | Williams | 290/48 |
| 4,464,576 | 8/1984 | Williams | 123/179 M |

*Primary Examiner*—L. T. Hix
*Assistant Examiner*—Brian W. Brown
*Attorney, Agent, or Firm*—Remy J. VanOphem

[57] ABSTRACT

A starter drive for engagement with the engine ring gear of an internal combustion engine for starting the internal combustion engine. The starter drive has a housing with a cavity formed therein, an electromagnet fixedly connected with the housing adjacent the cavity, a motor driven shaft extending through the electromagnet into the cavity, a first case connected to the motor driven shaft by a helical spline, an armature movably interconnected with the first case and engageable with the electromagnet, a second case movably interconnected with the first case but rotatably driven thereby, at least one biasing element interposed the first and second case, and a pinion gear rotatably driven by the second case through a one-way clutch, the pinion gear being selectively engaged with the engine ring gear to start the internal combustion engine.

21 Claims, 4 Drawing Figures

ELECTRIC ROLLER CLUTCH STARTER DRIVE

BACKGROUND OF THE INVENTION

The present invention relates to engine starters for internal combustion engines and, more particularly, to starters of the positive shift type wherein, after the starter motor pinion engages the flywheel gear of the engine to be started, the coaxial solenoid prevents the pinion gear from de-meshing until the starter motor is de-energized. The present invention represents an improvement over the engine starter drive taught in U.S. Pat. No. 4,366,385 issued Dec. 28, 1982, to Williams, owned by the assignee of the present application, the specification of which is hereby incorporated by reference.

Starter motors of the type having a shifting solenoid mounted on the outside of the starter motor housing have been used extensively in automotive and allied industries for starting internal combustion engines. However, in present industrial and automotive applications, this type of starter motor, often referred to as the "piggyback solenoid engine-starter", is not completely satisfactory because of the space that the piggyback solenoid occupies. Furthermore, it is desirable, from a production standpoint, to produce a starter housing that is easily adaptable to the various mounting positions required to satisfy a number of engine configurations. By eliminating the piggyback solenoid from the outside of the starter motor housing, the starter motor housing may be mounted in any desirable orientation on the engine without special consideration being given to the shifting solenoid or related parts. In addition, the starter motor can be manufactured to satisfy the various mounting requirements for various types of internal combustion engines, thereby limiting the need of manufacturing several types of starter motor housings.

Coaxial solenoid type starter motors, which eliminate the need for piggyback solenoids, have been known in the prior art. For example, Mattson, U.S. Pat. No. 3,084,561, uses a movable solenoid and helical splines to move the pinion and overrunning clutch prior to closing the motor power switch to rotate the armature.

Giometti, U.S. Pat. No. 3,572,133, has a friction connection between the shiftable drive portion and the starter motor housing for assisting the advance of the shiftable drive portion into engagement with the ring gear. An electromagnetic brake is also provided in order to prevent drive rotation and to facilitate drive advance into engagement with the ring gear. As the pinion drive engages the ring gear, the electromagnetic brake is de-energized.

Seilly U.S. Pat. No. 2,727,158, uses a solenoid to move the shiftable drive portion axially to initially engage the engine ring gear. As this occurs, a switch closes the contact to pass current through the motor to rotate the starter shaft. This causes the shiftable drive portion to further slide axially into full engagement with the ring gear. A catch ball arrangement is provided to secure the shiftable drive portion to the sleeve, which then de-energizes the solenoid.

In U.S. Pat. No. 3,124,694, Seilly provides an axially movable core to impart initial axial movement to the shiftable drive portion.

U.S. Pat. No. 3,922,558, to Hollyoak, provides an electromagnetic arrangement for moving the pinion assembly from its rest position to its operative position. In this drive connection, there is a member which bears against one end of the pinion assembly between the electromagnetic arrangement and the pinion assembly. This member, in the rest position of the pinion assembly, is trapped between the pinion assembly and a collar carried by the shaft. When the electromagnet is energized, it moves the armature in such a manner that the pinion assembly is urged by way of the member toward its operative position. The shaft and the pinion assembly rotate relative to the armature and the member when the electric motor is energized. However, the armature and the member act as a brake to inhibit rotation of the pinion assembly and the shaft, when the pinion assembly returns to its rest position. In the rest position, the member is trapped between the pinion assembly and the collar carried by the shaft.

In Nardone, U.S. Pat. No. 1,939,405, and in Celio, U.S. Pat. No. 2,333,765, an electromagnet is used to cause axial movement of the drive portion into mesh with the flywheel prior to causing rotation of the starter motor shaft.

None of the above identified prior art starter motors has proven to be entirely satisfactory for present day use for various reasons. Some of these starters were unreliable in service over an extended period of time. Others were too expensive to manufacture. Many other problems were also presented in the production of coaxial types of starters such as the provision of suitable electric characteristics of the solenoid and accompanying parts, the provision of a suitable on/off switching for the electric starting motor, and the reduction of overall manufacturing costs. Furthermore, all of the above identified prior art designs utilize an electromagnetic coil which requires a relatively large current draw to facilitate engagement of the starter drive with the ring gear.

In Williams, U.S. Pat. No. 4,366,385, a first solution to the above described problems was offered. In Williams, the starter drive advances the drive pinion on helical splines without rotation, by inertia, to engage the engine ring gear. The drive pinion is held in engagement with the engine ring gear by an engaging mechanism which allows the total motor torque to be transmitted to the ring gear until the motor is de-energized. More particularly, Williams provides a starter drive for internal combustion engines having a starter drive housing, a motor driven shaft, a cylindrical end portion, and a helical threaded portion between the cylindrical end portion and the motor. The starter drive includes a screw sleeve mechanism for cooperatively engaging the helical threaded portion on the motor driven shaft. A ring armature member is centrally disposed relative to the screw sleeve mechanism and is connected to the screw sleeve mechanism. Furthermore, a drive pinion is coaxially disposed on the cylindrical end portion of the motor driven shaft. A unidirectional clutch mechanism interconnects the screw sleeve mechanism and the drive pinion. Finally, the ring armature mechanism is engaged to the starter drive housing when the drive pinion is advanced along the motor driven shaft by rotation of the motor when the motor is energized so as to engage the engine ring gear. Thus, the drive pinion is held in engagement with the engine ring gear and total motor torque is transmitted to the ring gear until the motor is de-energized.

While Williams represented a substantial improvement over the prior art engine starter drives, the deceleration peak torque of the engine starter drive disclosed therein was somewhat higher than what is desirable which, in some instances, leads to premature drive failure and excessive ring gear wear. Furthermore, assembly of this engine starter drive was expensive.

The present invention provides an engine starter drive similar to that taught by Williams, but having a more compact configuration reducing the number of parts, and a reduced deceleration peak torque, thus resulting in space savings, a lower cost of assembly, and the use of lower cost materials.

SUMMARY OF THE INVENTION

The present invention is directed to an improved compact starter drive which advances the drive pinion on a helical spline without rotation, by inertia, to engage the engine ring gear. The drive pinion is held in engagement with the engine ring gear by an engaging mechanism which allows total motor torque to be transmitted to the ring gear until the motor is deenergized.

More particularly, the present invention provides an engine starter drive for internal combustion engines having a starter drive housing, a motor driven shaft, and an external helical spline formed on the motor driven shaft. A first case member is rotatably mounted on the motor driven shaft and is provided with an internal helical spline engaging the external helical spline of the motor shaft. An armature plate is rotatably mounted to the first case member and is selectively engageable with an electromagnetic coil mounted to the nose portion of the starter drive housing. A second case member is rotatably mounted to the motor driven shaft adjacent the first case member and is movably interconnected with the first case member such as to be axially displaceable relative thereto but rotatably driven thereby. A biasing element, such as a coil spring, is provided between the first and second case members. A pinion gear is also rotatably mounted to the motor driven shaft and is rotatably driven, through a one-way clutch, by the second case member. The pinion gear is selectively engageable with the engine ring gear of the engine to be started. The electromagnetic coil is wired so as to be energized when the engine starting motor is energized. When the engine starting motor is energized, the motor driven shaft is rotated. The first case member resists rotation due to inertia, causing it to traverse the external helical spline and to drive the pinion gear towards engagement with the engine ring gear and the armature plate towards engagement with the electromagnetic coil.

During an abutment condition between the pinion gear and the engine starting gear, the biasing element is temporarily compressed, and the abutment condition causes the pinion gear to rotate until the gear teeth become aligned, whereafter the biasing force of the biasing element advances the pinion gear into engagement with the engine starting gear. Meanwhile, the armature plate engages the electromagnetic coil so as to maintain the engine starting gear in engagement with the engine ring gear. Furthermore, the biasing element permits relative axial movement between the first case member and the second case member to store a small portion of the rotational energy supplied by the motor driven shaft until the inertia and friction of the engine is overcome.

It is, therefore, a primary object of this invention to provide an engaging mechanism which secures the ring armature mechanism to the starter drive housing as the drive pinion is advanced along the motor driven shaft by the rotation of the motor when the motor is energized so as to engage the engine ring gear, such that the drive pinion is held in full engagement with the engine ring gear by the engaging mechanism.

It is another object of the present invention to provide an engaging mechanism to hold the ring armature mechanism to the starter drive housing when the drive pinion is advanced along the motor driven shaft by the rotation of the motor when the motor is energized so as to engage the engine ring gear, such that the total motor torque is transmitted to the engine ring gear until the motor is de-energized.

It is yet another object of the present invention to provide an engaging mechanism which holds the ring armature mechanism to the starter drive housing after the drive pinion is advanced along the motor driven shaft by the rotation of the motor when the motor is energized so as to engage the engine ring gear such that the drive pinion is held in engagement with the engine ring gear until the engaging mechanism is de-energized. In addition, the unidirectional clutch mechanism interconnects the screw sleeve mechanism in the drive pinion so as to permit overrunning in one direction of rotation of the motor shaft.

It is still another object of the present invention to provide an electric inertia roller clutch starter drive of the type described above, having an increased effective cushion length, yet a decreased total assembly length.

It is a further object of the present invention to provide an engine starter drive of the type described above with a reduced number of components and reduced deceleration peak torque such that drive reliability is improved, ring gear life is extended, and lower cost materials may be used.

These and the many other objects, features, and advantages of the present invention will become apparent to those skilled in the art when the following detailed description is read in conjunction with the drawings appended hereto.

BRIEF DESCRIPTION OF THE DRAWINGS

In the drawings appended hereto, wherein like reference numerals refer to like components throughout.

DETAILED DESCRIPTION OF THE PREFERRED EMBODIMENT

Figure 1:
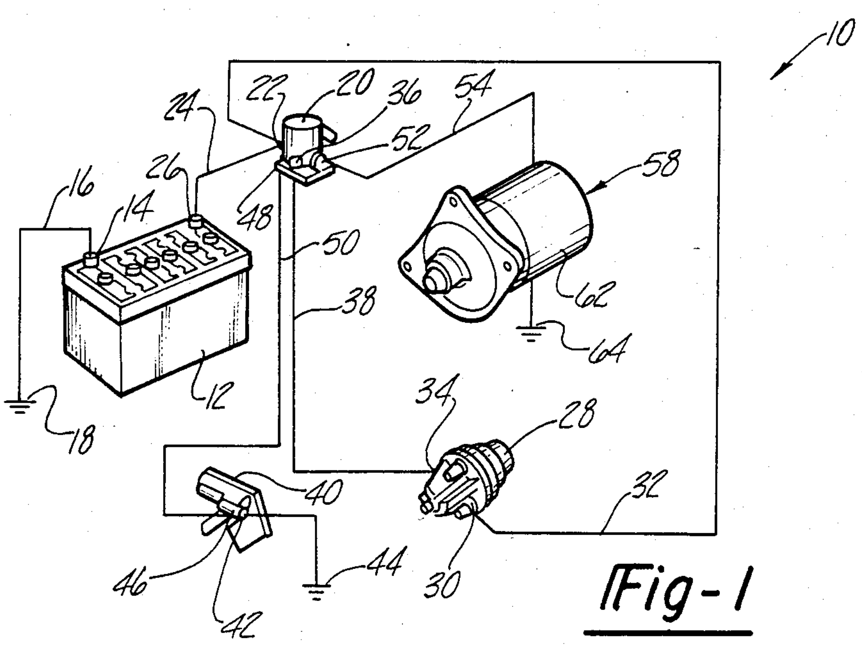
FIG. 1 is a schematic view of an electrical starting circuit for an engine starter drive according to the present invention.

Referring now to FIG. 1, an example of a starting circuit 10 used in conjunction with the engine starter drive of the present invention, is illustrated. A battery 12 is connected at a first terminal post 14 by a cable 16 to a ground, as shown at 18. A relay 20 is connected at a first relay terminal 22 by a cable 24 to a second terminal post 26 of the battery 12. A starter switch 28 is connected at a first starter switch terminal 30 by a cable 32 to the first relay terminal 22. A second starter switch terminal 34 of the starter switch 28 is connected to a second relay terminal 36 of the relay 20 by means of a cable 38. A transmission neutral switch 40 is connected at a first neutral switch terminal 42 to a ground as shown at 44. A second neutral switch terminal 46 of the transmission neutral switch 40 is connected to a third relay terminal 48 of the relay 20 by means of a cable 50. A fourth relay terminal 52 is connected by means of a cable 54 to a starter motor 58.

The starter motor 58 incorporates an engine starter drive 60, as shown generally in FIGS. 2, 3 and 4, and described later in greater detail. The starting circuit 10 is completed by connecting a starter motor housing 62 to a ground, as shown at 64 in FIG. 1.

Figure 2:
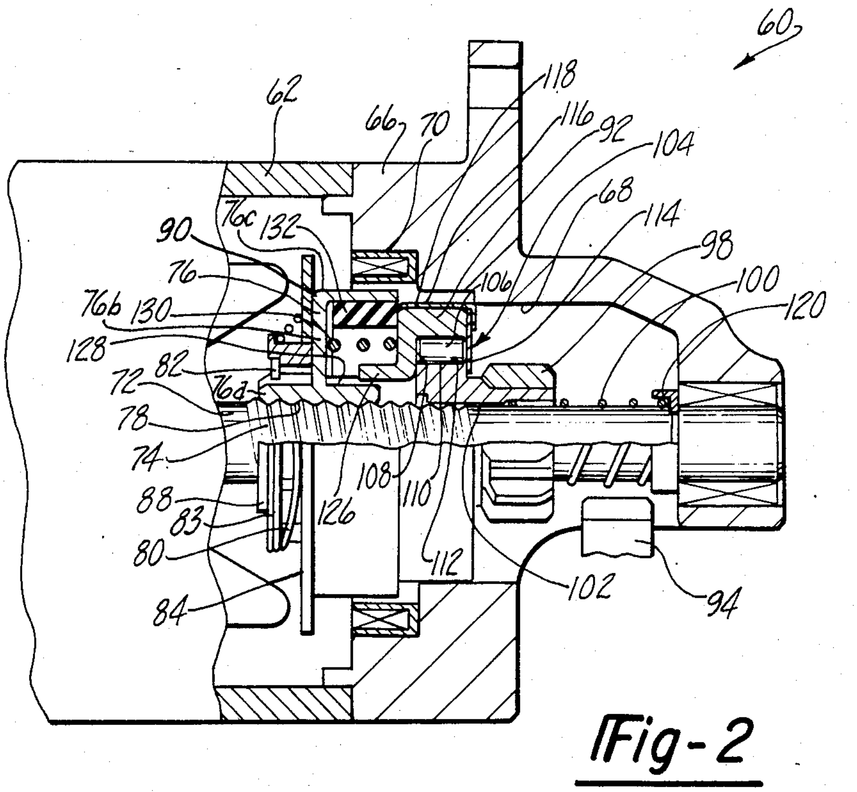
FIG. 2 is a side view, with parts cut away, of the preferred embodiment of the engine starter drive according to the present invention, shown in a de-energized condition.
Figure 3:
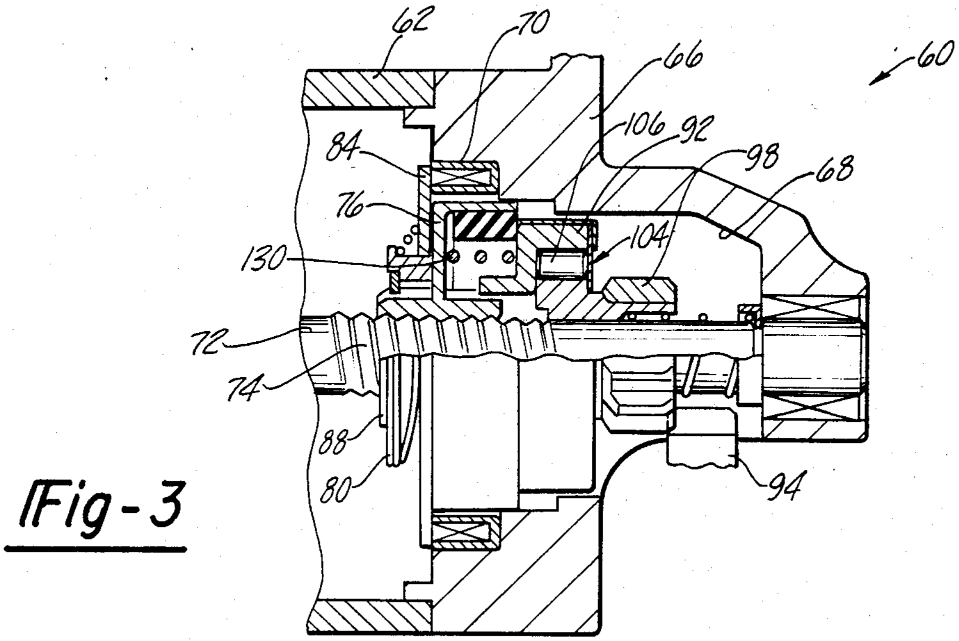
FIG. 3 is a side view similar to FIG. 2 but showing the engine starter drive in an energized condition with the pinion gear thereof in abutment with the engine ring gear of the engine to be started.
Figure 4:
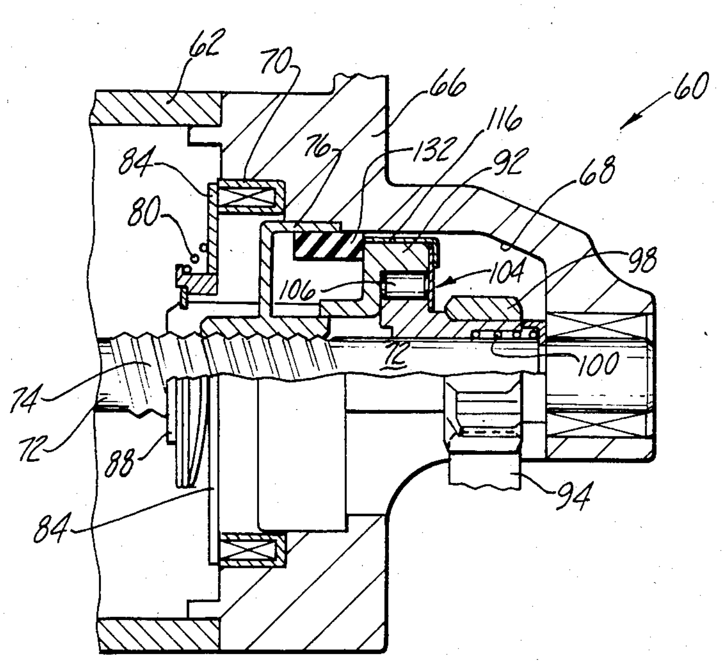
FIG. 4 is a side view similar to FIGS. 2 and 3 showing the engine starter drive in an engine cranking position.

As shown in FIGS. 2 through 4, the starter motor housing 62 of the engine starter drive 60 is provided with a nose portion 66 having a central cavity 68 formed therein. An annular electromagnetic coil 70 is fixedly interconnected with the nose portion 66 of the starter motor housing 62 adjacent the central cavity 68. A drive shaft 72 is rotatably mounted within the central cavity 68 of the nose portion 66 of the starter motor housing 62 in axial alignment with the electromagnetic coil 70. The drive shaft 72 is rotatably driven by a starting motor, not shown in the drawing. The drive shaft 72 is provided with an external helical spline 74 in a location near the electromagnetic coil 70.

A first case member 76, having an internal helical spline 78, is rotatably and axially displaceably mounted on the external helical spline 74 of the drive shaft 72, such as to be rotatably driven thereby. As is clear from the drawing, the first case member is made up of a cylindrical portion 76*a* which contains the internal helical spline 78, an annular disk-shaped portion 76*b* which extends radially from the cylindrical portion 76*a* and an axially extending flange 76*c* which extends from the portion 76*b* toward a second case member 92, as hereinafter described. Preferably, for simplicity in manufacturing and for the economics which result therefrom, the portions 76*a*, 76*b* and 76*c* of the first case member 76 are formed integrally with one another. An annular retaining member 80 is rotatably mounted to the first case member 76 and is secured thereto by a C-clip 82. A magnetically permeable armature plate 84 is rotatably and slidably mounted to the annular retaining member 80 and is biased towards the electromagnetic coil 70 by a wave spring 83. The wave spring 83 is mechanically interposed axially between the armature plate 84 and an annular flange 88 of the annular retaining member 80. An abutment surface 90 is formed by the first case member 76 to limit the motion of the armature plate 84 toward the electromagnetic coil 70.

The second case member 92 is disposed within the central cavity 68 of the nose portion 66 of the starter motor housing 62 such as to be rotatably and axially movable relative to the drive shaft 72. The second case member 92 is axially interposed between the first case member 76 and an engine ring gear 94 of the engine to be started, not shown in the drawing. The second case member 92 is interconnected with the first case member 76 by means of a plurality of tongues 126 extended from the second case member 92 into engagement with a plurality of slots 128 formed in the first case member 76. The second case member 92 is axially displaceable along the drive shaft 72 relative to the first case member 76 and is rotatably driven by the first case member 76. A coil spring 130 and an annular cushion member 132 are mechanically interposed between the second case member 92 and the first case member 76, such as to bias the second case member 92 away from the first case member 76 in a direction towards the engine ring gear 94. As shown, the axially extending flange 76*c* of the first case member 76 extends in a direction towards the second case member 92. The axially extending flange 76*c* houses the coil spring 130 and the annular cushion member 132 between the first and second case members. The axially extending flange 76*c* also forms a cavity accepting a portion of the second case member 92 therein, upon compression of the annular cushion member 132 and the coil spring 130.

A pinion gear 98 is also rotatably disposed about the drive shaft 72 within the central cavity 68 in a location axially between the second case member 92 and the engine ring gear 94. A coil spring 100 is located about the portion of the drive shaft 72 adjacent the engine ring gear 94. The coil spring 100 biases the pinion gear 98 in a direction towards the second case member 92. A suitable bushing 102 is provided between the pinion gear 98 and the drive shaft 72.

The pinion gear 98 is rotatably driven by the second case member 92 through a one-way clutch assembly 104 consisting, for example, of a plurality of clutch rollers 106 disposed within a plurality of suitable cavities 108 formed between an inner cylindrical surface 110 of the second case member 92 and an outer cylindrical surface 112 of the pinion gear 98. An annular plate 114 closes the cavities 108 and prevents undesirable axial movement of the clutch rollers 106. The annular plate 114 is secured in position by means of a sleeve 116 mounted to an outer cylindrical surface 118 of the second case member 92 and crimped into engagement with the annular plate 114. The annular plate 114 and the sleeve 116 also cooperate to prevent relative axial movement between the second case member 92 and the pinion gear 98, by abutting a shoulder on the pinion gear.

An abutment member 120 is mounted on the drive shaft 72 in the central cavity 68 of the nose portion 66 of the starter motor housing 62 to limit the longitudinal movement of the pinion gear 98 in a direction towards the engine ring gear 94.

The operation of the engine starter drive 60 of the present invention will now be described with reference to FIGS. 2 through 4. When the engine starter drive 60 is not energized, the drive shaft 72 is at rest and the electromagnetic coil 70 is not energized. Thus, the first and second case members 76 and 92 as well as the pinion gear 98 are backed away from the engine ring gear 94, as best shown in FIG. 2. When the starter motor 58 is energized, the electromagnetic coil 70 becomes energized and the drive shaft 72 is rotatably driven. The first case member 76 resists the rotational drive of the drive shaft 72 due to inertia and, accordingly, the first case member 76 advances along the external helical spline 74 of the drive shaft 72, as shown in FIG. 3 of the drawing, until the armature plate 84 engages the electromagnetic coil 70. The electromagnetic coil 70 prevents rotation of the armature plate 84. The electromagnetic coil 70 also prevents displacement of the first case member 76 in a direction away from the electromagnetic coil.

The advancement of the first case member 76, along the mutually cooperating helical splines in response to the rotational movement of the drive shaft 72, also advances the second case member 92, through the interaction of the plurality of tongues 126 mounted in the plurality of slots 128 in the first case member 76, and the pinion gear 98 in a direction towards the engine ring gear 94 until the pinion gear 98 engages with the teeth of the tongue ring gear or abuts the engine ring gear 94. Meanwhile, the inertia of the first and second case members 76 and 92, and of the pinion gear 98, is eventually overcome by the drive shaft 72 and, consequently, these three elements are rotatably driven by the drive shaft 72. If an abutment occurs, the pinion gear 98 and second case member 92 cannot be further axially displaced and begin to compress the coil spring 130. The first case member 76 continues to travel axially along the external helical spline 74 and in so doing moves rotatably along the external helical spline 74 with respect to the drive shaft, thereby causing rotatable movement of the second case member 92 and pinion gear 98 resulting in clearing the abutment condition and allowing the pinion gear 98 to mesh with the engine ring gear 94. The coil spring 130 biases the pinion gear 98 towards the engine ring gear 94 when the gear teeth of the pinion gear 98 become aligned with gaps between the gear teeth of the engine ring gear 94, at which time the coil spring 130 displaces the pinion gear 98 into engagement with the engine ring gear 94, as shown in FIG. 4.

Once the pinion gear 98 is engaged with the engine ring gear 94, the inertia and friction of the engine inhibit the rotation of the pinion gear 98 and the second case member 92. The first case member 76 is driven along the external helical spline 74 of the drive shaft 72, relative to the second case member 92, such as to compress the annular cushion member 132 therebetween. When the resistance to compression of the annular cushion member 132 exceeds the force required to overcome the inertia and friction of the engine, the total motor torque is transmitted to the pinion gear 98 by way of the one-way clutch assembly 104 and the engine is cranked. During an engine overrun condition, the first case member 76 is restored to its previous position as a result of the spring forces exerted thereagainst, resulting in a torque equal to and opposite to that of the overrunning clutch, thereby controlling armature free spin. The pinion gear 98 remains in engagement with the engine ring gear 94 until the electromagnetic coil 70 is de-energized, allowing the demeshing of these elements by inertia.

It will be readily apparent to those skilled in the art that the effective cushion length of the annular cushion member 132 may be substantially increased over that used in U.S. Pat. No. 4,366,385, described above and incorporated herein by reference, while providing a more compact assembly. Because of the compactness and increase in cushion length, the deceleration peak torque of the starter drive of the engine starter drive 60 is decreased to an acceptable level, improving the drive reliability and extending the life of the engine ring gear 94. Furthermore, lower cost materials may be used and the assembly and disassembly of the engine starter drive is simplified. Also, the engine starter drive 60 of the present invention has a substantially reduced number of components.

The above described preferred embodiment constitutes the best mode contemplated by the inventor at the time of filing for carrying out the present invention. It will nonetheless be appreciated by those skilled in the art that many variations and aodifications may be made from the structure described in detail above without departing from the spirit of the present invention. Such variations and modifications are included within the scope of the claims appended hereto.

What is claimed is:

1. A starter drive for engagement with the engine ring gear of an internal combustion engine for starting said internal combustion engine, said starter drive comprising:

a starter housing;

a cavity formed in said starter housing;

annular electromagnetic means fixedly positioned in said starter housing;

a motor driven shaft rotatably positioned in said cavity of said starter housing, said motor driven shaft having a portion passing through said annular electromagnetic means;

external helical means formed on said motor driven shaft, and including said portion passing through said annular electromagnetic means;

rotatable annular first case means disposed about said portion of said motor driven shaft, said first case means being disposed radially inwardly of said annular electromagnetic means and having a cylindrical portion disposed about said portion of said motor driven shaft;

an annular disk-shaped portion extending radially from said cylindrical portion; and an axially extending flange extending from said annular disk-shaped portion at a location remote from said cylindrical portion;

internal helical means formed in said cylindrical portion of said first case means, said internal helical means being drivingly engaged with said external helical means on said motor driven shaft;

magnetically permeable armature means rotatably interconnected with said first case means, said magnetically permeable armature means being selectively engageable with said annular electromagnetic means;

second case means movably disposed about said motor driven shaft adjacent said first case means, said second case means having a first portion interposed axially between said first case means and said engine ring gear and a second portion disposed radially inwardly of said first case means;

first interconnection means interconnecting said first case means and said second case means, said first interconnection means rotatably driving said second case means when said first case means is rotated, said first interconnection means permitting axial displacement between said first case means and said second case means;

biasing means interposed said first case means and said second case means, said biasing means abutting said cylindrical portion of said first case means and urging said first case means and said second case means axially away from each other, at least a portion of said biasing means being surrounded by said axially extending flange of said first case means;

pinion means movably disposed surrounding said motor driven shaft and adjacent said second case means, said pinion means being selectively engageable with said engine ring gear;

second interconnection means rotatably interconnecting said second case means and said pinion means, such as to prevent relative axial motion therebetween; and one-way clutch means interposed said second case means and said pinion means, said one-way clutch means permitting said second case means to rotatably drive said pinion means in one predetermined angular direction.

2. The starter drive according to claim 1 wherein said annular electromagnetic means comprises:

a magnetically permeable electromagnetic housing fixedly positioned in said starter housing;

an electromagnetic coil mounted within said magnetically permeable electromagnetic housing; and means for energizing said electromagnetic coil when said motor driven shaft is rotatably driven and for de-energizing said electromagnetic coil when said motor driven shaft is not driven.

3. The starter drive according to claim 1 wherein said cylindrical portion, said annular disk-shaped portion, and said axially extending flange are formed integrally with one another.

4. The starter drive according to claim 1 wherein said first interconnection means comprises at least one tongue extending from one case means of said first and second case means towards the other case means of said first and second case means and at least one slot formed in said other case means for engagement with said at least one tongue.

5. The starter drive according to claim 1 wherein said biasing means comprises a coil spring.

6. The starter drive according to claim 1 wherein said biasing means comprises a resilient annular member.

7. The starter drive according to claim 1 wherein said biasing means comprises:

first biasing means exerting a first predetermined biasing force, said first biasing means experiencing a first predetermined amount of deflection between said first and second case means in the event of an abutment condition between said pinion means and said engine ring gear; and second biasing means disposed between said first and second case means and compressed therebetween only after said first biasing means has exceeded said first predetermined amount of deflection, said second biasing means experiencing a second predetermined amount of deflection during a condition wherein said motor driven shaft is rotating more rapidly than said pinion means.

8. The starter drive according to claim 7 wherein said first biasing means comprises a coil spring.

9. The starter drive according to claim 7 wherein said second biasing means comprises a resilient annular member.

10. The starter drive according to claim 1 further comprising pinion biasing means positioned between said pinion means and said starter housing, said pinion biasing means biasing said pinion means away from said engine ring gear.

11. The starter drive according to claim 10 wherein said pinion biasing means comprises a coil spring disposed within said cavity and wound about said motor driven shaft.

12. The starter drive according to claim 1 further comprising:

first abutment means formed in said first case means;

second abutment means formed in said first case means and spaced a predetermined distance from said first abutment means; and armature biasing means positioned between said first abutment means and said magnetically permeable armature means, said armature biasing means biasing said magnetically permeable armature means in the direction towards said annular electromagnetic means and into abutment with said second abutment means.

13. The starter drive according to claim 12 wherein said armature biasing means comprises a wave washer.

14. A starter drive for engagement with the engine ring gear of an internal combustion engine for starting said internal combustion engine, said starter drive comprising:

a starter housing;

a cavity formed in said starter housing;

annular electromagnetic means fixedly positioned in said starter housing;

a motor driven shaft rotatably positioned in said cavity of said starter housing, said motor driven shaft having a portion passing through said annular electromagnetic means;

external helical means formed on said motor driven shaft, and including said portion passing through said annular electromagnetic means;

rotatable annular first case means disposed about said portion of said motor driven shaft, said first case means comprising a first case body and being disposed radially inwardly of said annular electromagnetic means, said first case means further comprising an armature support member interconnected with said first case body and a biasing surface formed on said armature support member;

internal helical means formed in said first case body of said first case means, said internal helical means being drivingly engaged with said external helical means on said motor driven shaft;

magnetically permeable armature means rotatably interconnected with said first case means, said magnetically permeable armature means being mounted to said biasing surface and selectively engageable with said annular electromagnetic means;

second case means movably disposed about said motor driven shaft adjacent said first case means, said second case means having a first portion interposed axially between said first case means and said engine ring gear and a second portion disposed radially inwardly of said first case means;

first interconnection means interconnecting said first case means and said second case means, said first interconnection means rotatably driving said second case means when said first case means is rotated, said first interconnection means permitting axial displacement between said first case means and said second case means;

biasing means interposed said first case means and said second case means, said biasing means urging said first case means and said second case means axially away from each other;

pinion means movably disposed surrounding said motor driven shaft and adjacent said second case means, said pinion means being selectively engageable with said engine ring gear;

second interconnection means rotatably interconnecting said second case means and said pinion means, such as to prevent relative axial motion therebetween; and one-way clutch means interposed said second case means and said pinion means, said one-way clutch means permitting said second case neans to rotatably drive said pinion means in one predetermined angular direction.

15. The starter drive according to claim 14 further comprising:

an abutment means formed on said first case body; and armature biasing means positioned between said magnetically permeable armature means and said armature support member, said armature biasing means biasing said magnetically permeable armature means in the direction towards said annular electromagnetic means and into abutment with said abutment means.

16. A starter drive for engagement with the engine ring gear of an internal combustion engine for starting said internal combustion engine, said starter drive comprising:

a starter housing;

a cavity formed in said starter housing;

annular electromagnetic means fixedly positioned in said starter housing;

a motor driven shaft rotatably positioned in said cavity of said starter housing, said motor driven shaft having a portion passing through said annular electromagnetic means;

external helical means formed on said motor driven shaft, and including said portion passing through said annular electromagnetic means;

rotatable annular first case means disposed about said portion of said motor driven shaft, said first case means being disposed radially inwardly of said annular electromagnetic means;

internal helical means formed in said first case means, said internal helical means being drivingly engaged with said external helical means on said motor driven shaft;

magnetically permeable armature means rotatably interconnected with said first case means, said magnetically permeable armature means being selectively engageable with said annular electromagnetic means;

second case means movably disposed about said motor driven shaft adjacent said first case means, said second case means having a first portion interposed axially between said first case means and said engine ring gear, and a second portion disposed radially inwardly of said first case means;

first interconnection means interconnecting said first case means and said second case means, said first interconnection means rotatably driving said second case means when said first case means is rotated, said first interconnection means permitting axial displacement between said first case means and said second case means;

biasing means interposed said first case means and said second case means, said biasing means urging said first case means and said second case means axially away from each other;

pinion means movably disposed surrounding said motor driven shaft and adjacent said second case means, said pinion means being selectively engageable with said engine ring gear;

second interconnection means rotatably interconnecting said second case means and said pinion means, such as to prevent relative axial motion therebetween, said second interconnection means comprising a cylindrical member having a first flange extending radially inwardly between said first and second case means and a second flange extending radially inwardly into engagement with said pinion means; and one-way clutch means interposed said second case means and said pinion means, said one-way clutch means permitting said second case means to rotatably drive said pinion means in one predetermined angular direction.

17. The starter drive according to claim 16 wherein said one-way clutch means comprises:

an inner surface formed on said second case means;

an outer surface formed on said pinion means, said outer surface on said pinion means being disposed radially inwardly of said inner surface on said second case means, said inner surface and said outer surface defining cavity means; and a plurality of roller clutch members positioned in said cavity means, said second flange of said cylindrical member securing said plurality of roller clutch members in position.

18. A starter drive for engagement with the engine ring gear of an internal combustion engine for starting said internal combustion engine, said starter drive comprising:

a starter housing;

a cavity formed in said starter housing;

an annular electromagnetic coil fixedly positioned in said starter housing adjacent said cavity;

a motor driven shaft rotatably positioned in said starter housing, said motor driven shaft having a portion passing through said annular electromagnetic coil;

external helical spline means formed on said portion of said motor driven shaft;

first case means disposed about said portion of said motor driven shaft;

internal helical spline means formed in said first case means, said internal helical spline means being drivingly engaged with said external helical spline means on said motor driven shaft;

first abutment means formed in said first case means;

second abutment means formed in said first case means and spaced a predetermined distance from said first abutment means;

magnetically permeable armature means rotatably interconnected with said first case means, said magnetically permeable armature means being selectively engageable with said electromagnetic coil;

first biasing means positioned between said first abutment means and said magnetically permeable armature means, said first biasing means urging said magnetically permeable armature means in the direction towards said annular electromagnetic coil and into engagement with said second abutment means;

second case means movably disposed about said motor driven shaft, said second case means being positioned between said first case means and said engine ring gear;

first interconnection means interconnecting said first case means and said second case means, said first interconnection means rotatably driving said second case means when said first case means is rotated, said first interconnection means permitting axial displacement between said first case means and said second case means;

pinion means movably disposed surrounding said motor driven shaft and adjacent said second case means, said pinion means being selectively engageable with said engine ring gear;

second interconnection means rotatably interconnecting said second case means and said pinion means such as to prevent relative axial motion therebetween;

one-way clutch means interposed said second case means and said pinion means, said one-way clutch means permitting said second case means to rotatably drive said pinion means in one predetermined angular direction;

second biasing means interposed said first case means and said second case means and exerting a first predetermined force, said second biasing means experiencing a first predetermined amount of deflection between said first case means and said second case means when an abutment condition exists between said pinion means and said engine ring gear;

third biasing means disposed between said first case means and said second case means and compressed therebetween only after said second biasing means has exceeded said first predetermined amount of deflection, said third biasing means experiencing a second predetermined amount of deflection causing a condition wherein said motor driven shaft is rotating in said one predetermined angular direction at a rate faster than said pinion means; and fourth biasing means interposed said pinion means and said starter housing such as to bias said pinion means away from said engine ring gear.

19. The starter drive according to claim 18 wherein said first case means comprises:

a cylinder portion disposed about said motor driven shaft, said internal helical spline means being formed in said cylindrical portion;

an annular disk-shaped portion extending radially from said cylindrical portion; said second and third biasing means abutting one face of said annular disk-shaped portion and said second abutment means comprising the other face of said annular disk-shaped portion;

an axially extending flange extending from said annular disk-shaped portion at a location remote from said cylindrical portion, said axially extending flange surrounding at least a portion of said second biasing means; and an armature support member interconnected with said first case means, said first abutment means being formed integrally with said armature support member and said magnetically permeable armature means being mounted to said armature support member.

20. The starter drive according to claim 19 wherein said cylindrical portion and said annular disk-shaped portion are formed integrally with one another.

21. The starter drive according to claim 18 wherein:

said first biasing means comprises a wave washer;

said second biasing means comprises a first coil spring;

said third biasing means comprises an annular washer disposed concentrically with said first coil spring;

said fourth biasing means comprises a second coil spring disposed within said cavity and wound about said motor driven shaft; and said first interconnection means comprises:

at least one tongue extending from one case means of said first and second case means towards the other case means of said first and second case means; and at least one slot formed in said other case means for engagement with said at least one tongue.

* * * * *

UNITED STATES PATENT AND TRADEMARK OFFICE

CERTIFICATE OF CORRECTION

PATENT NO. : 4,661,715

DATED : Apr. 28, 1987

INVENTOR(S) : Nicholas A. Volino

It is certified that error appears in the above-identified patent and that said Letters Patent is hereby corrected as shown below:

In The Specifications

Column 3, line 19, delete "deenergized" and insert ---- de-energized ----.

Column 7, line 64, delete "aodifications" and insert ---- modifications ----.

Signed and Sealed this

Thirteenth Day of October, 1987

*Attest:*

DONALD J. QUIGG

*Attesting Officer*

*Commissioner of Patents and Trademarks*